United States Patent
Osborn et al.

(10) Patent No.: US 7,577,549 B2
(45) Date of Patent: Aug. 18, 2009

(54) SYSTEM AND METHOD FOR TRENDING EXHAUST GAS TEMPERATURE IN A TURBINE ENGINE

(75) Inventors: Brock Estel Osborn, Niskayuna, NY (US); John Erik Hershey, Ballston Lake, NY (US); Michael Dean Fullington, West Chester, OH (US); James Ernest Dockendorff, Cincinnati, OH (US); William Lee Herron, Cincinnati, OH (US); Carl Harold Hansen, Latham, NY (US)

(73) Assignee: General Electric Company, Niskayuna, NY (US)

( * ) Notice: Subject to any disclaimer, the term of this patent is extended or adjusted under 35 U.S.C. 154(b) by 718 days.

(21) Appl. No.: 11/183,689

(22) Filed: Jul. 18, 2005

(65) Prior Publication Data

US 2007/0012044 A1    Jan. 18, 2007

(51) Int. Cl.
*G01F 19/00*    (2006.01)

(52) U.S. Cl. .................................... 702/184; 374/100
(58) Field of Classification Search ................. 702/184, 702/182, 183, 185, 188; 374/1, 100
See application file for complete search history.

(56) References Cited

U.S. PATENT DOCUMENTS

| 6,408,259 B1 | 6/2002 | Goebel et al. ............... 702/183 |
| 2004/0148940 A1* | 8/2004 | Venkateswaran et al. ...... 60/772 |

* cited by examiner

*Primary Examiner*—Edward Raymond
(74) *Attorney, Agent, or Firm*—Patrick K. Patnode

(57) ABSTRACT

A method for estimating a trend in exhaust gas temperature in a turbine engine includes sampling exhaust gas temperature and a plurality of variables associated with the exhaust gas temperature over a set of observation times for a turbine engine to acquire exhaust gas temperature data. A trend in the exhaust gas temperature for the specific turbine engine is identified by removing the effect of the plurality of variables on the exhaust gas temperature data.

22 Claims, 10 Drawing Sheets

SYSTEM AND METHOD FOR TRENDING EXHAUST GAS TEMPERATURE IN A TURBINE ENGINE

BACKGROUND

The invention relates generally to turbine engines and, particularly, to analyzing operational parameters and identifying performance changes in a turbine engine over a period of operation. Specific embodiments of the present technique provide a method for trending exhaust gas temperature and, thus, engine deterioration of a turbine engine based on measurable parameters of the turbine engine.

In general, engine deterioration results in an increase in the exhaust gas temperature (EGT). Unfortunately, exhaust gas temperature is a function of several other variables, which vary at different times and conditions during take-off, flight, and landing. As a result, the exhaust gas temperature is not readily apparent or obtainable for purposes of predicting engine deterioration.

The existing approach for estimating engine deterioration involves analyzing a plurality of engines to create an ensemble model, which is then used to estimate engine deterioration for a particular engine outside of the ensemble of engines. Unfortunately, the ensemble model may be inaccurate due to the unique operational patterns, maintenance history, manufacturing tolerances, and other characteristics of each individual engine. In other words, the ensemble model may predict engine deterioration too early or too late for a particular engine. An early prediction could result in early downtime and lost operation hours for a particular engine, whereas a late prediction could result in undesirable performance, unscheduled repairs, and unexpected delays in a flight schedule.

Hence, there exists a need for an improved and reasonably accurate method for estimating the exhaust gas temperature trends of a turbine engine.

BRIEF DESCRIPTION

The present technique accordingly provides a novel approach toward trending exhaust gas temperature based on measurable variables that are functionally related to the exhaust gas temperature. In one aspect, the present technique provides a method for operating a turbine engine. The method includes sampling exhaust gas temperature and a plurality of variables associated with the exhaust gas temperature over a set of observation times for a turbine engine to acquire exhaust gas temperature data. A trend in the exhaust gas temperature for the specific turbine engine is identified by removing the effect of the plurality of variables on the exhaust gas temperature data. The present technique also provides computer programs and routines comprising code adapted to implement the above-described method.

In another aspect, the present technique provides a method for using a turbine engine. The method includes scheduling downtime for a specific turbine engine based on a prediction of engine deterioration corresponding to an identified trend of exhaust gas temperature for the specific turbine engine. The identified trend is based on sampled data sets of exhaust gas temperature and correlated variables for the specific turbine engine after at least one effect of these correlated variables is removed from the exhaust gas temperature data In yet another aspect, the present technique provides a system for trending exhaust gas temperature in a turbine engine. The system includes a plurality of sensors configured to sample exhaust gas temperature and a plurality of variables associated with the exhaust gas temperature over a set of observation times for a turbine engine to acquire exhaust gas temperature data. The system further includes an exhaust gas trend measurement system configured to remove at least one effect of the plurality of variables on the exhaust gas temperature data to enable identification of a trend in the exhaust gas temperature for the turbine engine. In still another aspect, the present technique provides a method for manufacturing the system described above.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
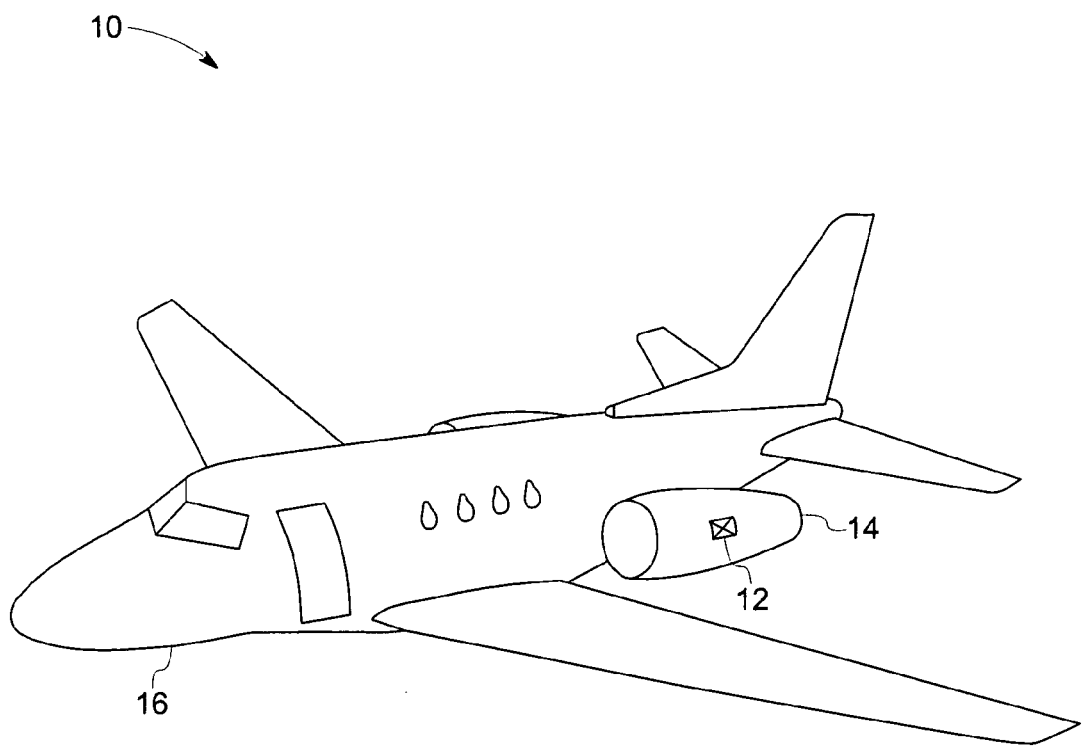
FIG. 1 is a schematic diagram illustrating an aircraft embodying aspects of the present technique.

As discussed in detail below, embodiments of the present technique function to provide a novel and accurate estimation of a trend in exhaust gas temperature (EGT) to analyze engine deterioration for a turbine engine. The disclosed embodiments use data from a single subject engine and therefore provide an improvement over estimation based on data from an ensemble of engines. An exemplary application of the present technique is an aircraft engine. Referring now to the drawings, FIG. 1 illustrates an aircraft 10 having an EGT trend measurement system 12 disposed in an aircraft engine 14 coupled to a body or frame 16 of the aircraft 10. In the illustrated embodiment, the engine 14 comprises a gas turbine combustion engine. The EGT trend measurement system 12 is configured for measuring exhaust gas temperature of the engine 14, and utilizing exhaust gas temperature data to determine a trend in exhaust gas temperature for analysis of engine deterioration, as will be described in detail below generally referring to FIGS. 2-13.

Figure 2:
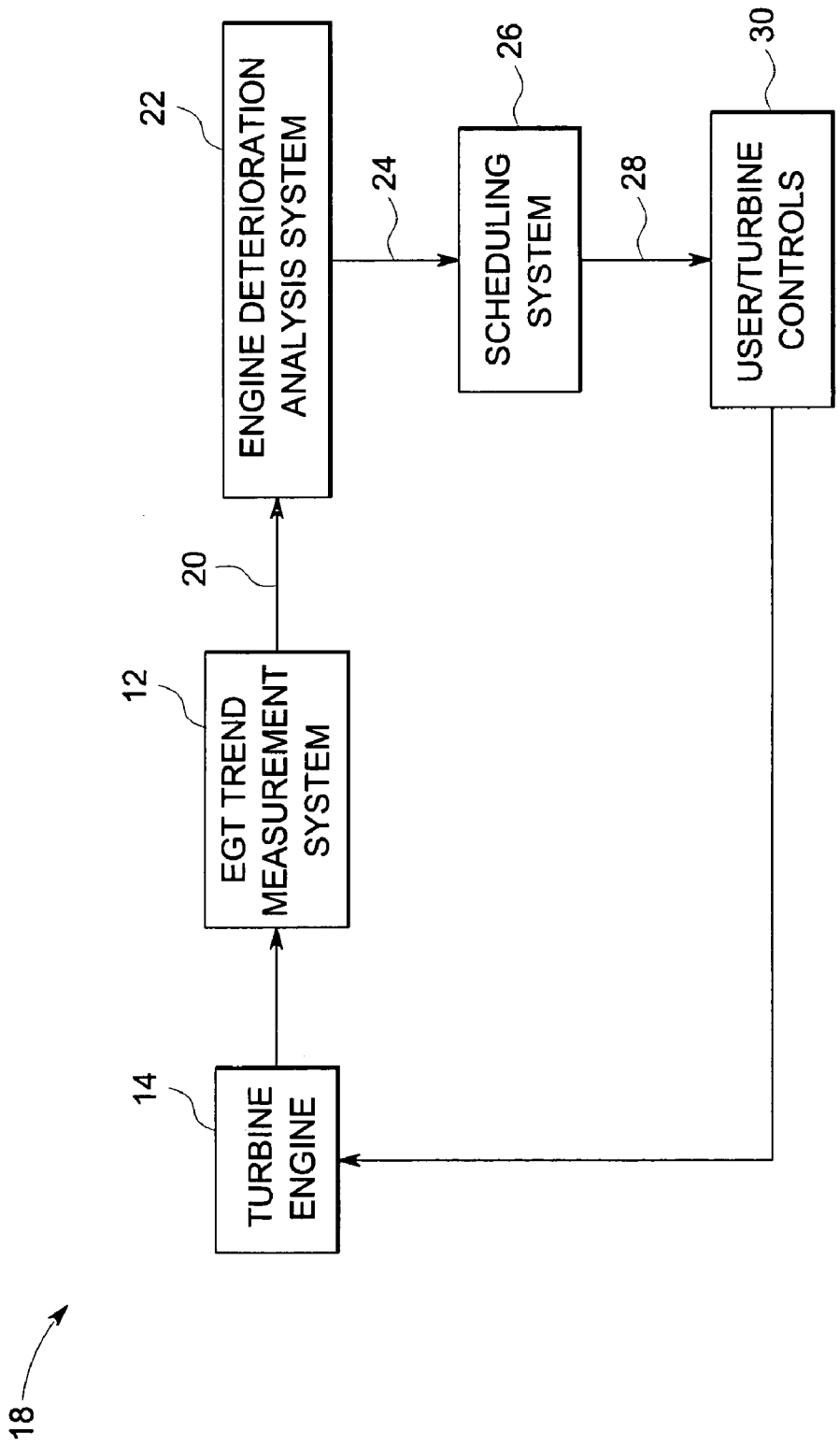
FIG. 2 is a block diagram of a turbine engine monitoring system according to aspects of the present technique.

Turning now to FIG. 2, a block diagram illustrates a system 18 for monitoring an aircraft engine based on exhaust gas temperature trends in accordance with one embodiment of the present technique. In the illustrated embodiment, the EGT trend measurement system 12 is coupled to the turbine engine 14 and is configured for trending exhaust gas temperature of a turbine engine 14 based on measurable parameters associated with the engine 14. As described below, the EGT trend measurement system 12 may incorporate sensors to measure exhaust gas temperature and related internal and external engine parameters. For example, internal parameters include, without limitation, core speed, fan speed, derate, cold/hot engine start, bleed settings, among others. Examples of external parameters include, without limitation, input air temperature, humidity, altitude of takeoff run-way (in case of an aircraft engine), etc. In accordance with the present technique, the EGT trend measurement system 12 is configured to utilize the sensed data to identify trends in the exhaust gas temperature by removing the effect of these parameters on the exhaust gas temperature data.

Output 20 of the EGT trend measurement system comprises corrected exhaust gas temperature data and may include a graphical representation of exhaust gas temperature trends as illustrated below with reference to FIGS. 11 and 12. The output 20 is coupled to an engine deterioration analysis system 22 configured to determine engine deterioration rates based on the identified EGT trends. In certain embodiments, the engine deterioration analysis system 22 includes a computer with special data processing software, which functions to determine a rate of exhaust gas temperature increase and to forecast a desired engine downtime when a preselected critical level of engine deterioration has been reached. Output 24 of the engine deterioration analysis system 22 may include an engine shutdown forecast signal. The output 24 of the engine deterioration analysis system 22 may be further coupled to a scheduling system 26, which is operable to schedule downtime for the engine 14. For example, the scheduling system 26 may function to schedule repairs, replacement, servicing, or maintenance on the engine 14 based on one or more forecasts points, e.g., increasing levels of engine deterioration eventually reaching a critical level indicating a need for an engine overhaul or replacement. The scheduling system 26 also may communicate scheduling information or commands 28 to the user controls and/or turbine controls 30 on the aircraft to ensure proper attention to the forecasts. These commands 28 also may command the aircraft to remain grounded upon reaching a certain level of engine deterioration, thereby ensuring that the engine 14 is serviced or replaced before the aircraft is taken to flight again.

Figure 3:
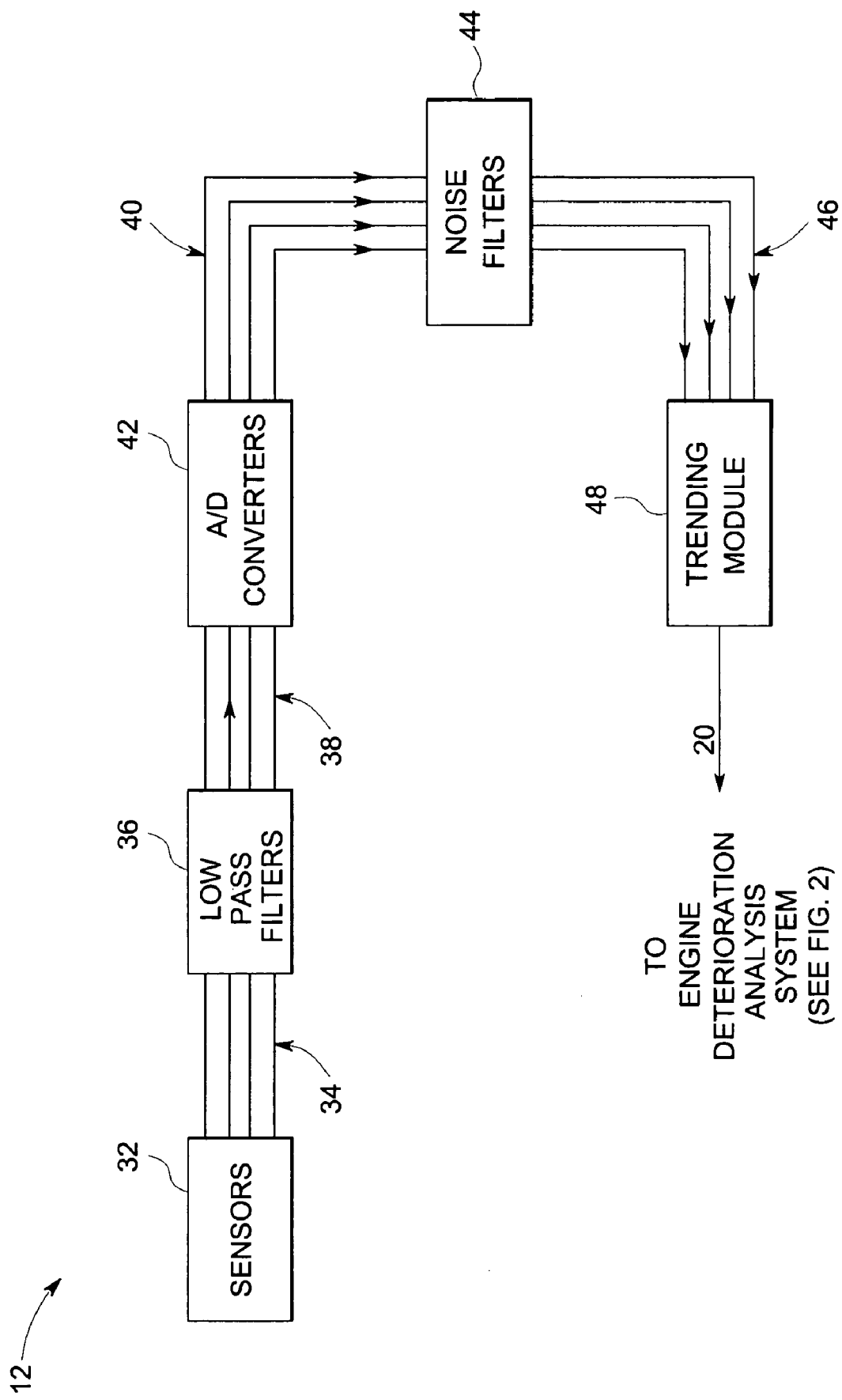
FIG. 3 is a block diagram of an exhaust gas temperature trend measurement system according to aspects of the present technique.

FIG. 3 illustrates a block diagram of an EGT trend measurement system 12 according to a specific embodiment of the present technique. In the illustrated embodiment, the EGT trend measurement system 12 includes sensors 32 adapted to measure engine exhaust gas temperature and a plurality of variables associated with the engine exhaust gas temperature. As discussed in detail below, these variables may be intrinsic to the engine 14, or external variables influencing the exhaust gas temperature of the engine 14. For example, as noted above, the extrinsic variables may include input air temperature, humidity, altitude of takeoff run-way, etc. Examples of intrinsic variables include core speed, fan speed, derate, cold/hot engine start, bleed settings, among others. Accordingly, the sensors 32 may be physically disposed internal and/or external to the turbine engine 14.

Measurement signals 34 from the sensors 32 may be coupled to low pass filters 36 to eliminate anomalously large signals. In one embodiment, the low pass filters 36 may include anti-alias filters. The low pass filtered signals 38 are then converted into digitized data 40 via analog to digital (A/D) converters 42. The digitized signals 40 may be further coupled to digital noise filters 44 to mitigate noise and errors associated with the digital data 40. In an exemplary embodiment, noise filters 44 may include median filters to remove anomalous data points from the digital data 40. The filtered digital data 46 is then utilized by a trending module 48, which is configured to identify trends in the exhaust gas temperature for subsequent analysis of engine deterioration. As discussed in greater detail below referring generally to FIGS. 6-9, the trending module 48 may incorporate algorithms or computer readable instructions adapted to reduce noise in digitized exhaust gas temperature data due to the effect of the associated variables on the exhaust gas temperature data.

Figure 4:
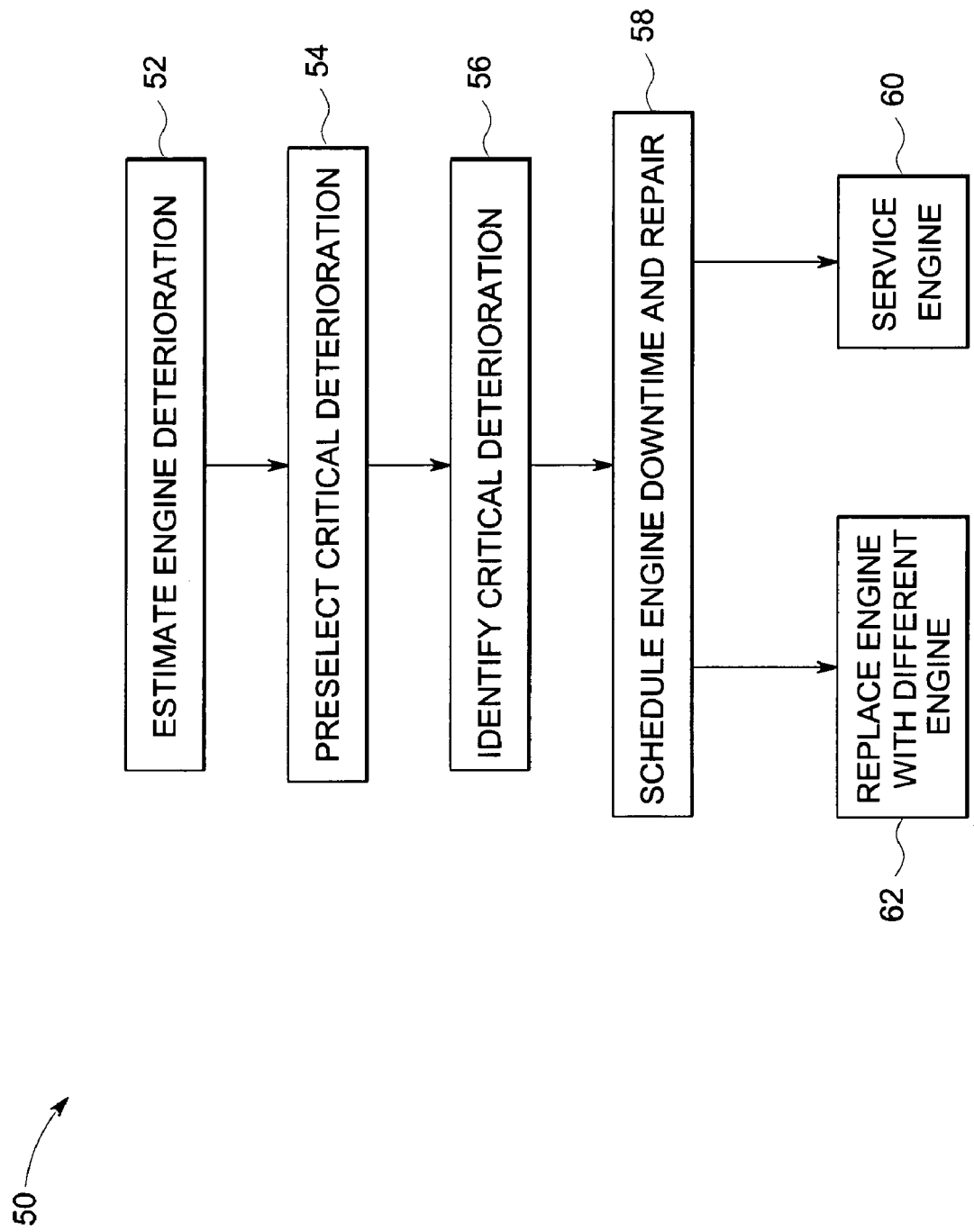
FIG. 4 is a flowchart illustrating a method for operating a turbine engine according to aspects of the present technique.

Referring now to FIG. 4, a flowchart illustrates a method 50 of operating a turbine engine in accordance with one embodiment of the present technique. The method 50 begins at block 52 by estimating engine deterioration. As discussed above, estimation of engine deterioration may include determining a rate of engine deterioration based on identified trends in exhaust gas temperature for a specific engine 14 rather than an ensemble of engines. At block 54, a critical level of engine deterioration is preselected. In one embodiment, preselection of a critical engine deterioration level may be forecast or estimated based on historical EGT trend data of the specific engine 14. Again, the trend data and forecast are based on the specific engine 14 rather than an ensemble of engines. At block 56, a check is made on the engine deterioration rate to identify whether the critical deterioration has been reached. In case the engine deterioration rate reaches or exceeds the critical deterioration level, an engine downtime and/or repair is scheduled (block 58). The engine may then be taken off-wing and serviced or repaired (block 60). In certain embodiments, the existing engine, while on service, may be replaced with a different engine (block 62)

Figure 5:
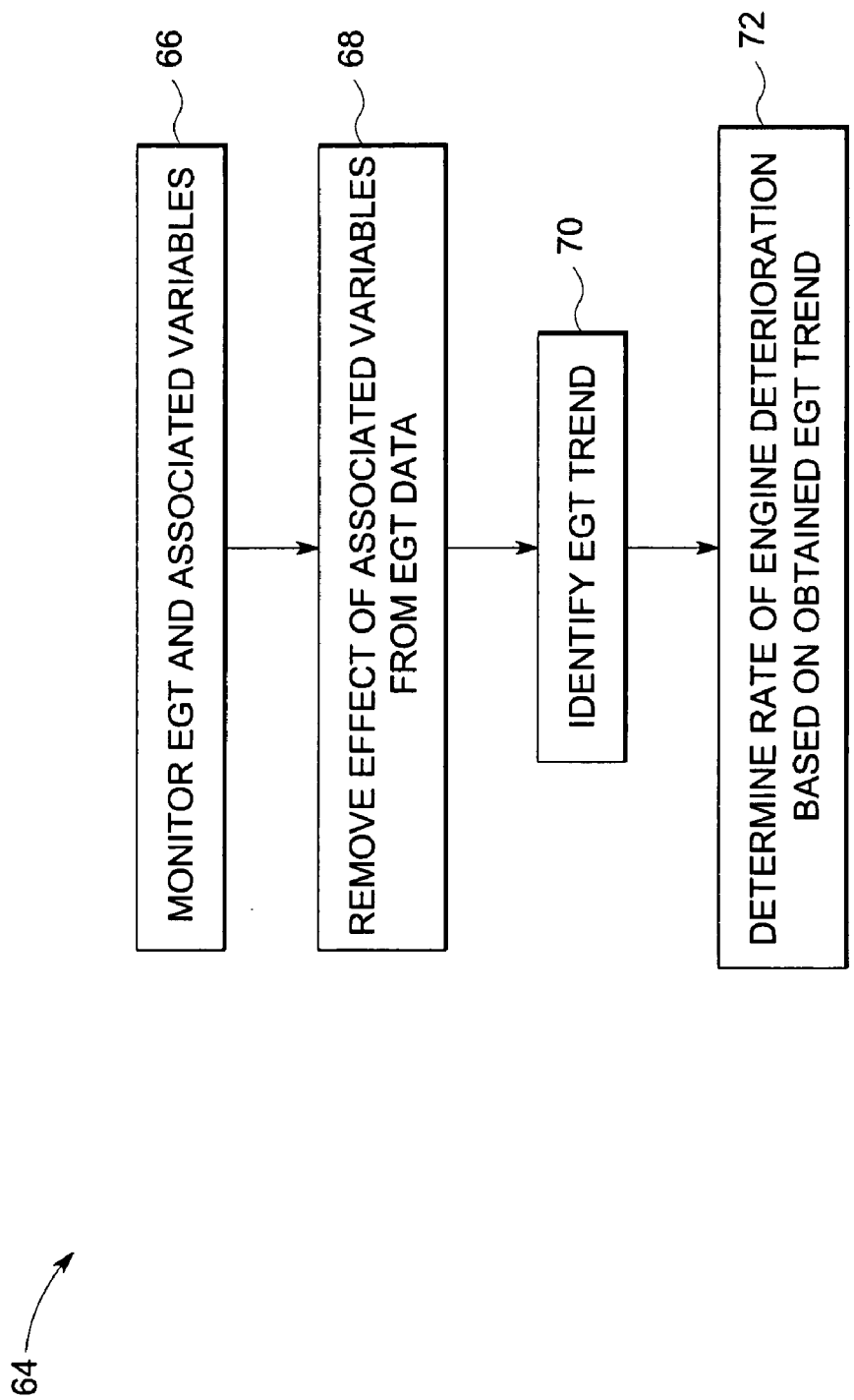
FIG. 5 is a flowchart illustrating a method for monitoring a turbine engine based on exhaust gas temperature trends according to aspects of the present technique.

FIG. 5 is a flowchart illustrating a method 64 for monitoring various parameters of a turbine engine for trends in EGT data according to one embodiment of the present technique. The method 64 includes sensing and monitoring exhaust gas temperature and associated variables (block 66) as discussed above with reference to FIG. 3. Again, the variables may include extrinsic variables, such as input air temperature, humidity, altitude of takeoff run-way, etc, and internal variables, such as core speed, fan speed, derate, cold/hot engine start, bleed settings, among others. At block 68, the method 64 proceeds by removing the effect of these associated intrinsic and extrinsic variables on the exhaust gas temperature data. In the illustrated embodiment, block 68 is implemented by the algorithms incorporated in the trending module 48 (FIG. 3). An embodiment of block 68 of the method 64 is discussed in greater detail below referring generally to FIGS. 6-9. At block 70, a trend in exhaust gas temperature is identified after removing noise in EGT data and identifying a slope in the resulting plot of the EGT. Finally, at block 72, rate of engine deterioration is determined based on the obtained EGT trend as discussed above.

Figure 6:
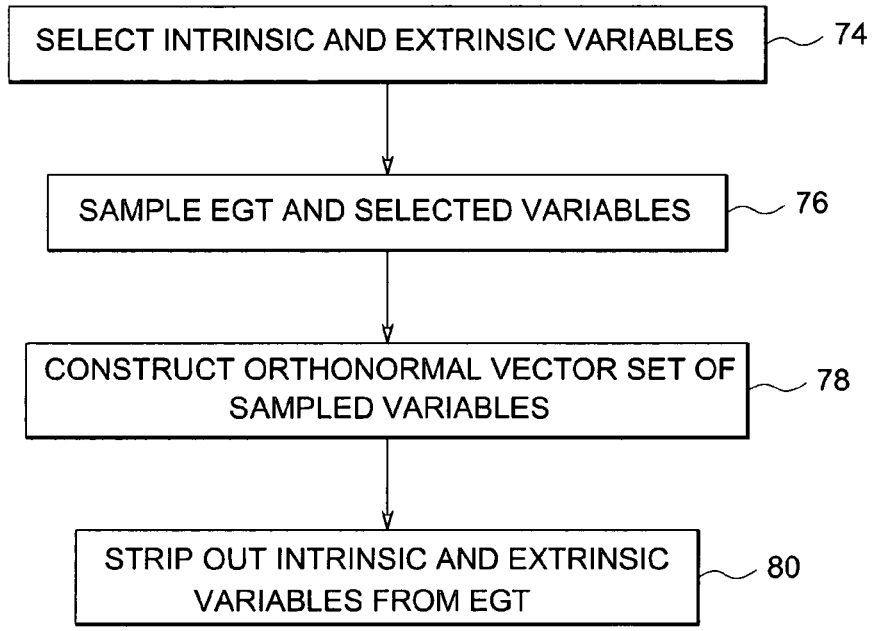
FIG. 6 is a flowchart illustrating a method for removing the effect of associated variables on exhaust gas temperature data, according to aspects of the present technique.

FIG. 6 is a flowchart illustrating an exemplary method 68 for removing the effect of associated variables from EGT data according to one embodiment of the present technique. As discussed earlier, exhaust gas temperature (EGT) is a noisy variable on account of the fact that it is correlated with several intrinsic and extrinsic variables. This complicates the task of identifying trends in the EGT, which are buried within this noise. The method 68 facilitates accurate estimation of EGT trends by removal of the correlations of these variables with the EGT.

The method 68 begins at block 74 by identifying and selecting such variables that are associated with engine EGT. In an exemplary embodiment, variables intrinsic to the engine may include core speed, fan speed, derate, cold/hot engine start, bleed settings, among others. Variables extrinsic to the engine may include input air temperature, humidity, altitude of takeoff run-way, etc. Next, at block 76, the engine EGT is sampled by sensors over a predetermined set of observation points. These observation points may be, for example, spread over 2-4 years and separated by a known number of engine cycles. Further, the selected intrinsic and extrinsic variables are sampled at the same set observation points as the EGT. The method 68 proceeds at block 78 by constructing an orthogonal vector set of the time-ordered samples of the intrinsic and extrinsic variables. As known to one skilled in the art, an orthogonal vector set is one in which the product of any two component vectors is zero. Mathematically, if a set S of vectors is orthogonal, then for every $v_i$ and $v_j$ in S, $v_i \cdot v_j = 0$. In the illustrated embodiment, block 78 includes constructing an orthonormal vector set. As will be appreciated by one skilled in the art, an orthonormal vector set is one in which the product of any two component vectors is zero, and the magnitude of each vector is unity, i.e. for every $v_i$ and $v_j$ in an orthonormal vector set S, $v_i \cdot v_j = 0$, and $|v_i| = 1$. The selected variables may, in turn, be correlated with each other. Accordingly, block 78 may further include removing correlations between the selected variables to arrive at a true orthonormal vector set. An embodiment of block 78 is described in greater detail below referring to FIG. 7. The selected intrinsic and extrinsic variables are subsequently stripped from the sampled EGT data at block 80. Block 80 therefore reduces the noise in the EGT data, thereby facilitating reasonably accurate estimation of EGT deterioration. Block 80 is described in greater detail hereinafter with reference to FIG. 9.

Figure 7:
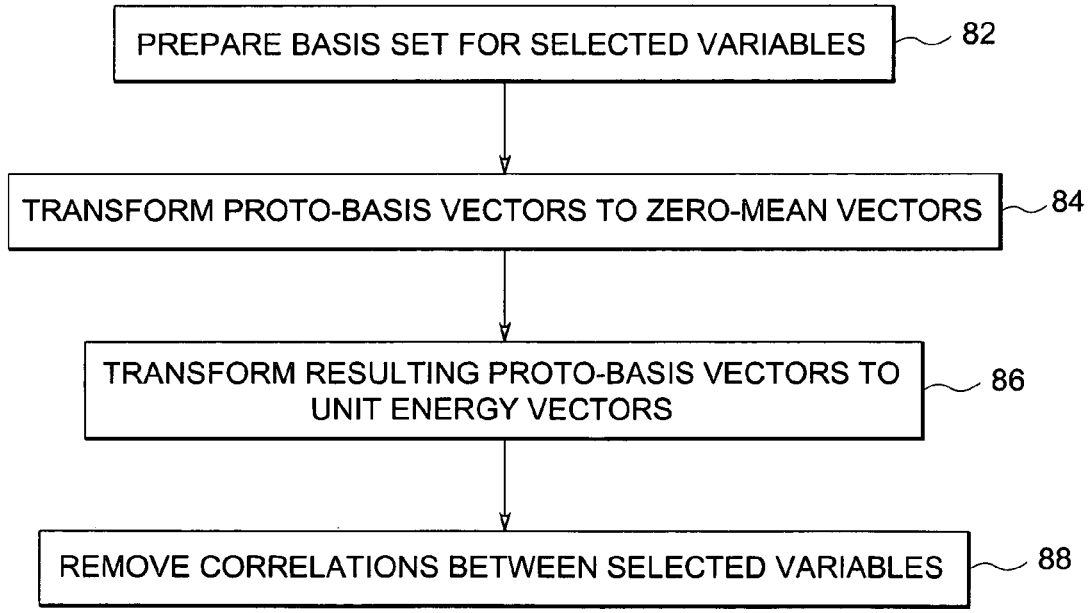
FIG. 7 is a flowchart illustrating a method for constructing an orthonormal vector set of intrinsic and extrinsic variables according to aspects of the present technique.

Referring now to FIG. 7, an exemplary method 78 is illustrated for constructing an orthonormal vector set of the sampled intrinsic and extrinsic variables according to one embodiment of the present technique. The first step of the method 78 is preparation of a basis set of the selected variables (block 82). The set of each variable's time-ordered samples may be referred to as a proto-basis vector. For example, if "n" intrinsic and extrinsic variables are selected and sampled over W observation points, then the basis set is produced from the proto-basis vectors of all the variables and is composed of n-sets of W-contiguous samples of the n-proto-basis vectors. The parameter W will also serve as the window length as indicated in block 112 of FIG. 9.

The samples may be indexed by k where $m \leq k \leq m+W-1$. The basis set may be represented by the relationship (1) as illustrated below $$v_1 = v_1(m), v_1(m+1), \ldots, v_1(m+W-1)$$
$$v_2 = v_2(m), v_2(m+1), \ldots, v_2(m+W-1)$$
$$\vdots$$
$$v_n = v_n(m), v_n(m+1), \ldots, v_n(m+W-1)$$

(1)

wherein, $v_1, v_2 \ldots v_n$ are the proto-basis vectors corresponding to each of the n selected variables.

At block 84, the proto-basis vectors are transformed zero-mean vectors, i.e., the mean of the time ordered samples of each proto-basis vector is made to be zero. This may be accomplished by the following substitutions:

$$v_i \leftarrow v_i - \sum_k v_i(k)/W$$

(2)

Next, at block 86, the proto-basis vectors (2) are made to be unit-energy, i.e. the modulus of the elements of each of the proto-basis vectors is made to be unity. The above may be brought about by the following substitutions:

$$v_i \leftarrow v_i \bigg/ \sqrt{\sum_k v_i^2(k)}$$

(3)

The resulting basis set (i.e the set of zero-mean and unit energy proto-basis vectors) may not comprise a true orthonormal vector set as the selected intrinsic and extrinsic variables may be correlated to each other. Mathematically, this implies that the correlation index $$\sum_{\substack{k \\ i \neq j}} v_i(k) v_j(k)$$

may have a non-zero value. Hence the method 16 may additionally include removing these correlations between the proto-basis vectors to obtain a true orthonormal vector set (block 88).

Figure 8:
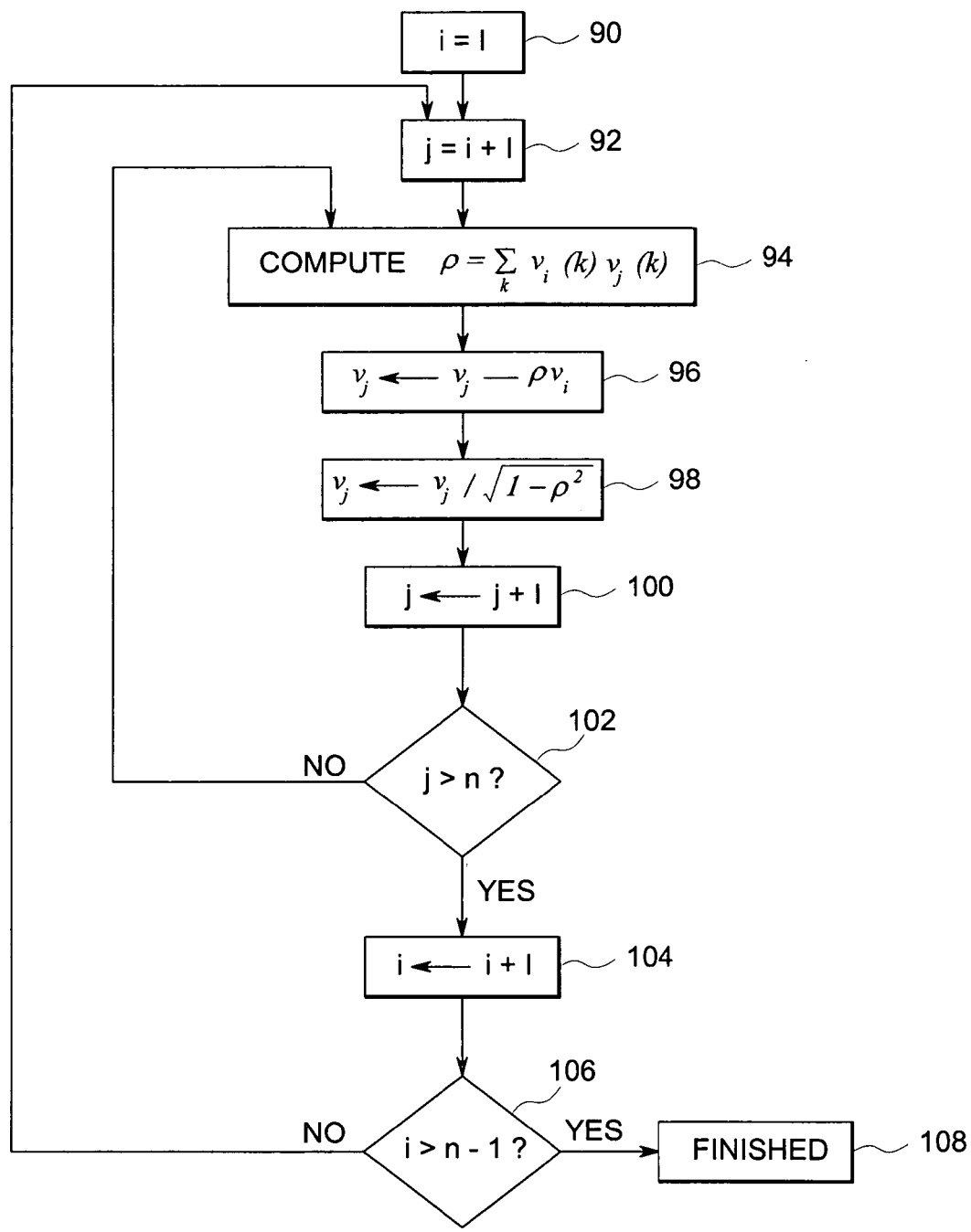
FIG. 8 is a flowchart illustrating a method for removing correlations between selected variables according to aspects of the present technique.

FIG. 8 is a flowchart illustrating an exemplary method 88 for removing correlations between the intrinsic and extrinsic variables according to one embodiment of the present technique. In illustrated embodiment, i and j are chosen as indices for the proto-basis vectors. The method 88 begins by initializing the index i to unity (block 90). That is, the proto-basis vector $v_1$ is selected as the first member of the orthonormal basis set. It should be noted that all of the proto-basis vectors are already zero-mean and unit-energy. Next, at block 92, the index j is initialized to the value of index i incremented by unity. At block 94, the correlation index between $v_i$ and $v_j$ is computed and denoted by ρ. At block 96, $v_j$ is adjusted by subtracting $\rho v_i$ from it. This causes $v_j$ to remain zero-mean, but its energy is no longer unity. The vector $v_j$ is then renormalized at block 98 to a unit energy basis vector. Index j is then incremented by unity (block 100). At block 102, the index j is tested to see if it has spanned its assigned vectors. If it has not, the control is returned to block 94. If it has, control passes to block 104. Next at block 104, the index i is incremented by unity. At block 106, the index i is tested to see if all of the proto-vectors have been converted into an orthonormal set. If not, control is returned to step 92. The method 88 terminates (block 108) when all the vectors have been converted into an orthonormal set.

Figure 9:
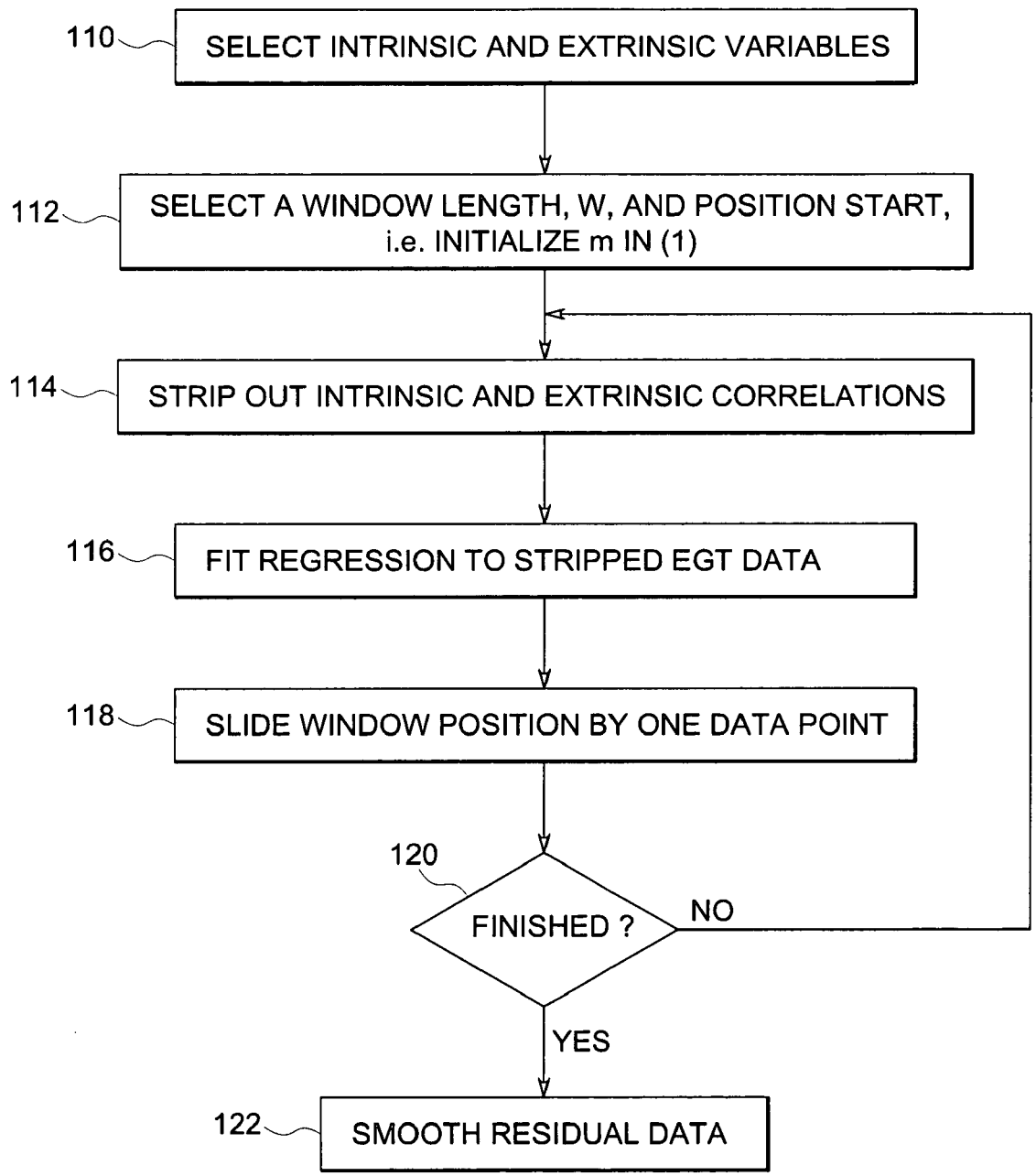
FIG. 9 is a flowchart illustrating a method for removing intrinsic and extrinsic correlations from EGT data according to aspects of the present technique.

Referring back to FIG. 6, the orthonormal vector set obtained at block 78 is utilized at block 80 to strip out intrinsic and extrinsic variables from the EGT data. FIG. 9 is a flowchart illustrating an exemplary method 80 for stripping out the selected variables from the EGT sampled at block 76. The method 80 begins at block 110 by selecting all of the known intrinsic and extrinsic variables, or a proper subset thereof, associated with the exhaust gas temperature from the orthonormal vector set obtained at block 80 (see FIG. 6). Next at block 112, a window length W is selected. The choice of W is arbitrary and may vary based on the analyst's preference. A relatively small value of W generally leads to estimates of EGT deterioration rate that are relatively high, while a relatively high value of W generally provides a pronounced smoothing of the estimated EGT deterioration rate. Further at block 112, the sample index m of equation (1) is set to its initial value. This value will usually be at the start of the data records. The method 80 then proceeds to block 114 wherein the intrinsic and extrinsic correlations between the orthonormal basis vectors and the EGT are stripped over the present window of length W. This is done by performing the following operation for each member of the orthonormal basis:

$$EGT \leftarrow EGT\left(1 - \sum_k v_i(k)EGT(k)\right) \quad (4)$$

The EGT data thus obtained is independent of correlations with the selected intrinsic and extrinsic variables. This stripped EGT data may then be plotted and curve-fitted with regression techniques, such as linear regression, in the W-point window. This is represented as block 116 of the method 80. The slope of the fitted regression line may be considered to be the slope of EGT increase, i.e., the rate of EGT margin deterioration.

At block 118, the sample index m is incremented by unity to shift the W-point window by one sample. Next at block 120, a check is carried out to determine if there are W new points in the window. If there are, control is returned to block 114. The method 80 may additionally include a block 122 that incorporates a smoothing algorithm to smooth the slope of the EGT curve fit obtained at block 116.

Figure 10:
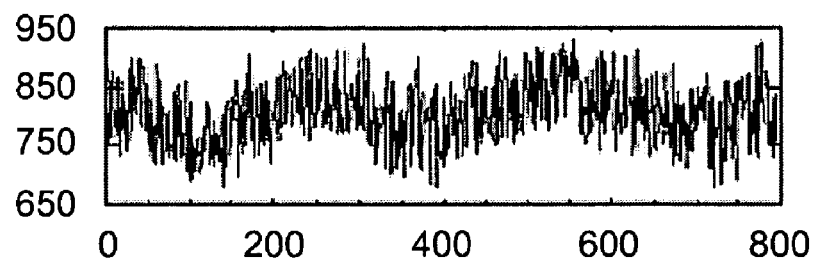
FIG. 10 is an exemplary plot illustrating EGT data sampled over a set of observation points.

FIG. 10 shows an exemplary plot 124 of EGT (represented along a Y-axis) at 795 observation points (represented along an X-axis). The points may be separated by a known number of cycles, nominally 5. In the illustrated embodiment, the 795 observation points are taken during take-off of a particular aircraft engine and are spaced in time over a period of 3 years. As illustrated in FIG. 10, due to the inherent noise in the EGT, it is difficult to identify trends of EGT deterioration.

Figure 11:
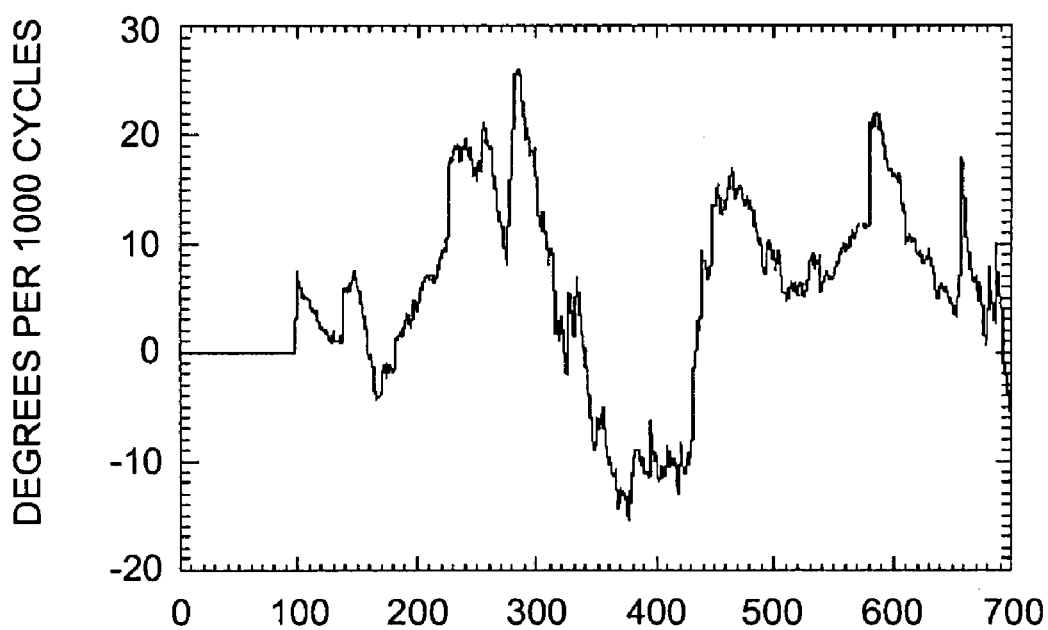
FIG. 11 is an exemplary plot illustrating EGT data with effect the intrinsic and extrinsic variables being removed.

FIG. 11 illustrates a plot 126 of the EGT data obtained at block 116 of FIG. 4 after stripping out intrinsic and extrinsic correlations and applying a linear regression fit on the stripped EGT data. The plot illustrated in FIG. 11 illustrates EGT data sampled at observation points 100-700. The window length, W, is arbitrarily selected to be 100. The data of FIG. 11 may further be smoothed in accordance with block 122 of FIG. 9. The smoothed EGT data may be represented by an exemplary plot 128 illustrated in FIG. 12. An exemplary smoothing algorithm to integrate the data of FIG. 6 is represented by a relationship (5) described below.

$$EGTG(k)=EGTG(k-1)+EGTS(k)*(CYCLES(k)-CYCLES(k-1)), 100 \leq k \leq 700 \; EGTG(99)=0 \quad (5)$$

where EGTG represents exhaust gas temperature growth and EGTS is the slope of the EGT plot 66 at an observation point k.

Figure 12:
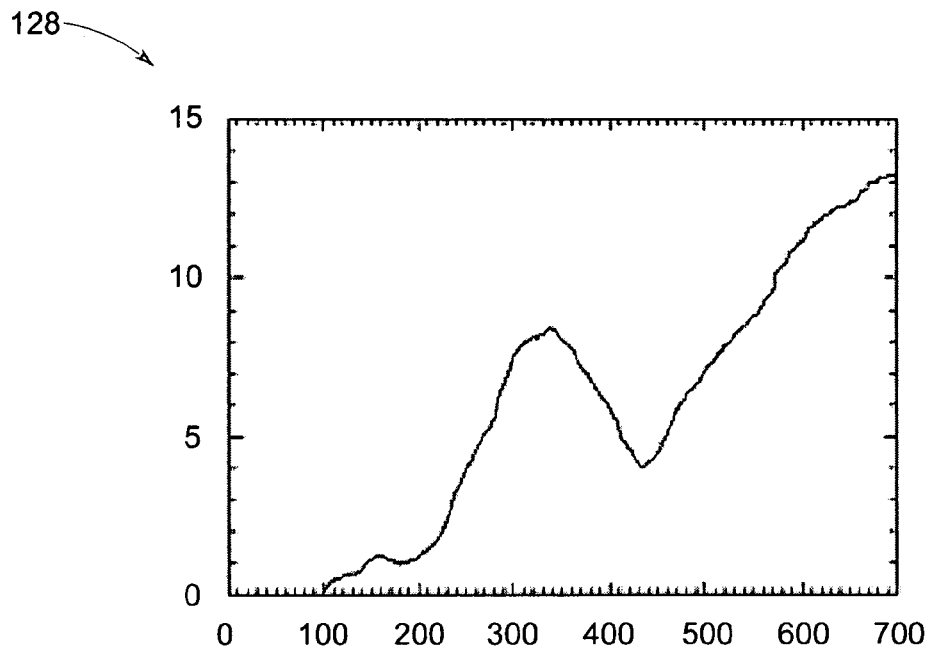
FIG. 12 is an exemplary plot illustrating smoothed growth in EGT within the given set of observation points.

Referring to FIGS. 11 and 12 in conjunction with FIG. 3, plots 126 and 128 exemplify the output 20 of the trending module 48. Such plots may then be utilized by the engine deterioration analysis system to determine engine deterioration rates based on the trend identified in the plots.

The embodiments described above thus provide a novel method to estimate EGT trends based on data obtained from one specific engine rather than an ensemble of engines. In other words, the illustrated embodiment is not related to, or dependent upon, statistics derived from an ensemble of engines or previously acquired and analyzed data. Further, the technique advantageously accommodates and integrates newly identified and measured intrinsic and extrinsic variables associated with the EGT. The estimate of EGT deterioration can therefore be made increasingly accurate as more data becomes available. The present technique is especially amenable to integration into a trend-estimating service that has the luxury of Remote Monitoring & Diagnostics (RMD) data.

As will be appreciated, the above described techniques may take the form of computer or controller implemented processes and apparatuses for practicing those processes. Aspects of the present technique may also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The techniques described may further be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention.

Figure 13:
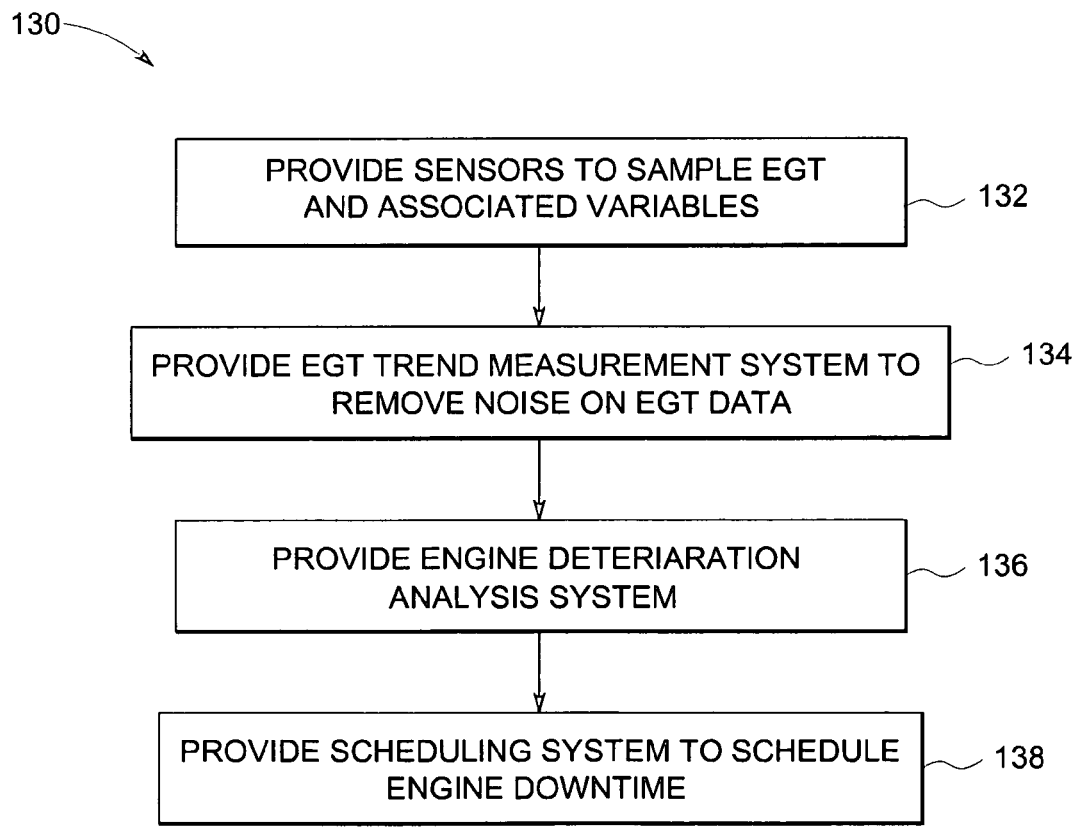
FIG. 13 is a flowchart illustrating a method for manufacturing a turbine engine according to aspects of the present technique.

Aspects of the present technique may be incorporated to provide a method for manufacturing a turbine engine. FIG. 13 is a flowchart illustrating a method 130 for manufacturing a turbine engine according to aspects of the present technique. The method 130 includes providing a plurality of sensors adapted to sample engine EGT and associated variables (block 132). The method 130 further includes providing an EGT trend measurement system configured to monitor the sampled EGT and remove noise on the EGT data caused by the associated variables to facilitate identification of EGT trends (block 134). Still further, the method includes providing an engine deterioration analysis system to determine engine deterioration rates based on the identified EGT trends and to predict a preselected level of engine deterioration for the turbine engine based on the trend in the exhaust gas temperature for the turbine engine (136). In certain embodiment, the method 130 may additionally include providing a scheduling system to schedule engine downtime and/or repair (block 138) based on the trend in the exhaust gas temperature as discussed above.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:
1. A method comprising:
sampling exhaust gas temperature and a plurality of variables associated with the exhaust gas temperature over a set of observation times for a turbine engine to acquire exhaust gas trend data; and removing at least one effect of the plurality of variables on the exhaust gas temperature data to enable identification of a trend in the exhaust gas temperature data for the turbine engine.

2. The method of claim 1, comprising identifying the trend in the exhaust gas temperature data to enable analysis of engine deterioration of the turbine engine.

3. The method of claim 2, comprising predicting a preselected level of engine deterioration for the turbine engine based on the trend in the exhaust gas temperature data for the turbine engine.

4. The method of claim 1, wherein the plurality of variables comprise at least one intrinsic variable for the turbine engine.

5. The method of claim 4, wherein the at least one intrinsic variable comprises core speed, or fan speed, or derate, or hot engine start, or cold engine start, or bleed setting, or combinations thereof.

6. The method of claim 1, wherein the plurality of variables comprise at least one extrinsic variable for the turbine engine.

7. The method of claim 6, wherein the at least one extrinsic variable comprises input air temperature, or humidity, or altitude, or combinations thereof.

8. The method of claim 1, wherein the effect of the plurality of variables comprises a plurality of correlations between the variables and the exhaust gas temperature data, and wherein removing the effect comprises constructing an orthogonal vector set of the plurality of variables and removing the correlations from the exhaust gas temperature data using the orthogonal vector set to generate corrected exhaust gas temperature data.

9. The method of claim 8, wherein the orthogonal vector set comprises an orthonormal vector set, and wherein constructing the orthonormal vector set comprises preparing a proto-basis vector for each of the plurality of variables and transforming the proto-basis vector into a zero-mean and unit energy vector.

10. The method of claim 8, further comprising fitting a regression to the corrected exhaust gas temperature data to generate regressed exhaust gas data.

11. The method of claim 10, further comprising smoothing of the regressed exhaust gas temperature data.

12. A method for estimating a trend in exhaust gas temperature of a turbine engine, comprising:
selecting a plurality of variables associated with the exhaust gas temperature;
sampling the exhaust gas temperature and the selected variables over a predetermined set of observation points to acquire exhaust gas temperature data, wherein the exhaust gas temperature data comprises a plurality of correlations with the variables; and
removing the correlations from the exhaust gas temperature data.

13. A method, comprising:
scheduling downtime for a specific turbine engine based on a prediction of engine deterioration corresponding to an identified trend of exhaust gas temperature for the specific turbine engine, wherein the identified trend is based on sampled data sets of exhaust gas temperature and correlated variables for the specific turbine engine after at least one effect of the correlated variables is removed from the sampled data sets of exhaust gas temperature.

14. The method of claim 13, further comprising servicing the turbine engine based on the prediction.

15. The method of claim 13, further comprising replacing the turbine engine with a replacement turbine engine based on the prediction.

16. The method of claim 13, wherein scheduling downtime for the specific turbine engine comprises scheduling downtime and possible repairs for an aircraft having the specific turbine engine.

17. At least one computer readable media, comprising:
code adapted to sample exhaust gas temperature and a plurality of variables associated with the exhaust gas temperature over a set of observation times for a turbine engine for acquiring exhaust gas temperature data; and
code adapted to remove at least one effect of the plurality of variables on the exhaust gas temperature data to enable identification of a trend in the exhaust gas temperature data for the turbine engine.

18. The at least one computer readable media of claim 17, wherein the effect of the plurality of variables comprises a plurality of correlations between the variables and the exhaust gas temperature data, the computer readable media further comprising code adapted to construct an orthogonal vector set of the plurality of variables and remove the correlations from the exhaust gas temperature data using the orthogonal vector set.

19. A system comprising:
a plurality of sensors configured to sample exhaust gas temperature and a plurality of variables associated with the exhaust gas temperature over a set of observation times for a turbine engine to acquire exhaust gas temperature data; and
an exhaust gas trend measurement system configured to remove at least one effect of the plurality of variables on the exhaust gas temperature data to enable identification of a trend in the exhaust gas temperature for the turbine engine.

20. The system of claim 19, further comprising an engine deterioration analysis system configured to predict a preselected level of engine deterioration for the turbine engine based on the trend in the exhaust gas temperature data for the turbine engine.

21. The system of claim 19, further comprising a scheduling system to schedule downtime for the turbine engine based on the trend in the exhaust gas temperature data.

22. The system of claim 19, wherein the turbine engine comprises an aircraft engine.

* * * * *